June 30, 1970  C. E. GRIGSBY  3,518,349
PERFORATED OR VENTILATED SHELL FOR ELECTRIC ARC FURNACES
Filed Dec. 3, 1968  2 Sheets-Sheet 1
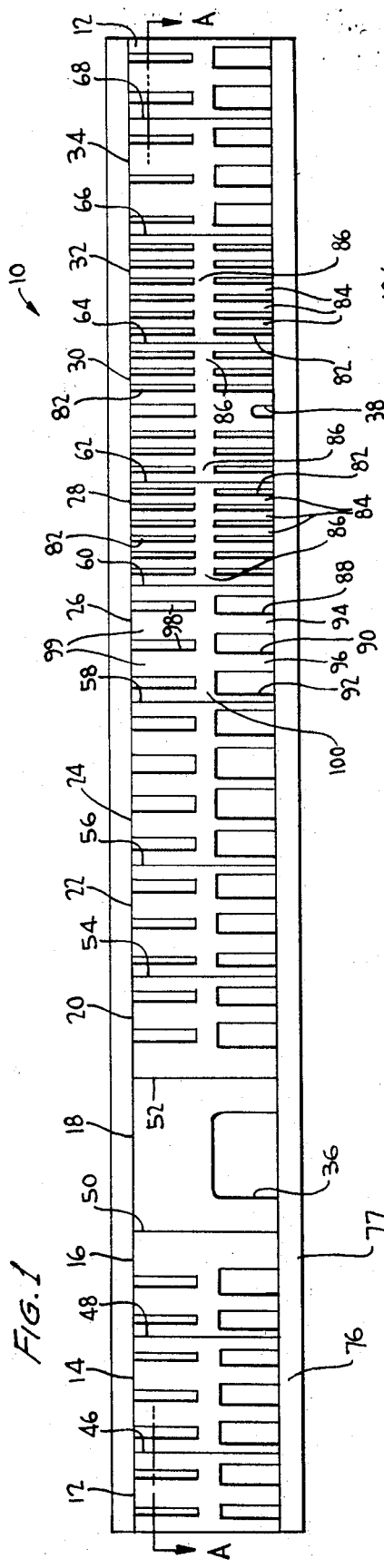
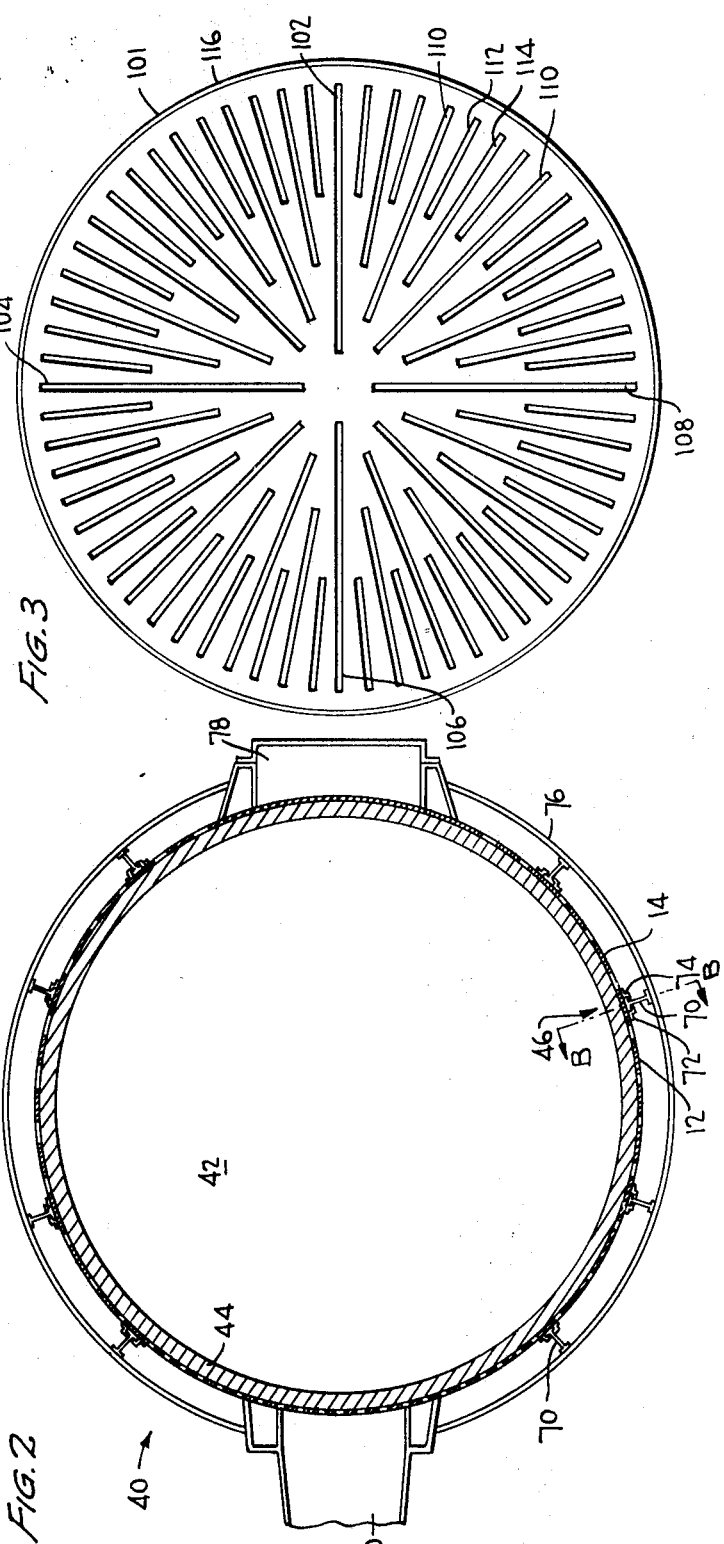
INVENTOR,
CHESTER EARL GRIGSBY
BY
ATTORNEYS

INVENTOR,
CHESTER EARL GRIGSBY
ATTORNEYS

United States Patent Office 3,518,349
Patented June 30, 1970

3,518,349
PERFORATED OR VENTILATED SHELL FOR ELECTRIC ARC FURNACES
Chester E. Grigsby, Philadelphia, Pa., assignor to General Refractories Company, Philadelphia, Pa., a corporation of Pennsylvania
Filed Dec. 3, 1968, Ser. No. 780,761
Int. Cl. H05b 7/18; F27d 1/10
U.S. Cl. 13—10                    7 Claims

ABSTRACT OF THE DISCLOSURE

A steel supporting structure for a furnace comprising refractory bricks, including a plurality of rigidly fixed steel plates surrounding the refractory bricks and forming an outer supporting steel sidewall, and bottom plate therefor. These plates are provided with a plurality of vertical or horizontal elongated slots for exposing and cooling the outer surfaces of the refractory bricks by means of the thermal updraft created by the "chimney effect" of the slots in the plates thereby extending the useful service of the refractory bricks.

---

The present invention relates to a steel sidewall and bottom for supporting refractory bricks, and, more particularly, to a perforated steel sidewall and bottom which retain refractory bricks in a furnace wall and bottom and permit active cooling of the outer ends of the bricks for increased useful life thereof.

A furnace fabricated from refractory bricks requires a supporting structure for preventing dislodgment of the bricks, especially if the furnace is of the type, such as an electric art or basic oxygen steel furnace, which is tilted for charging, tapping, slagging or combination of these operations. Such a supporting structure usually takes the form of a one-piece cylindrical steel sidewall and bottom surrounding and supporting a refractory brick lining. A serious disadvantage in the usual form of such construction is that the sidewall insulates the refractory bricks from beneficial cooling effects of moving ambient atmosphere, despite the fact that it is constructed from steel, which has 40–50 times the thermal conductivity as the bricks themselves. As a result, the white hot lining is penetrated by destructive molten slag and associated melted fumes to a depth of several inches, when the lining is new. The penetrated slag then cools within the brick causing deterioration and spalling, necessitating unnecessarily frequent shutdown of the furnace while its lining is replaced. The present invention alleviates the problems encountered in the prior art furnaces by greatly reducing the depth of penetration of the destructive slag and associated fumes into the refractory bricks. According to the invention, a perforated steel supporting structure of particular construction exposes the bricks to the cooling effects of moving ambient air. As a result, a steep temperature gradient is produced across the refractory bricks, causing destructive molten slag and fumes to cool and solidify before penetration into the brick to an excessive depth. Accordingly, spalls caused by stresses produced at the junction of the penetrated and unpenetrated portions of brick are thinner and lining life is greatly increased.

Accordingly, it is an object of the invention to provide the information needed to guide "on the job" cutting of ventilating slots in a supporting structure for a refractory brick furnace wall, whether the furnace is comprised of a one-piece cylindrical wall and bottom or is a structure comprised of a plurality of steel plates.

Another object of the invention is to provide a supporting structure for a refractory brick furnace wall, which structure is comprised of a plurality of steel plates provided with openings which permit ventilation of a refractory brick lining to the cooling effects of ambient air.

Another object of the invention is to provide a plurality of openings in a steel supporting structure for refractory bricks which openings are preferably, but not necessarily, of elongated vertical configurations to create thermal updrafts due to the "chimney effect" along outer ends of bricks exposed by the openings, whereby said bricks are cooled.

A further object of the invention is to provide a supporting shell having openings for exposing outer surfaces of refractory brick furnace linings, wherein the size of each of the openings determines the number of bricks exposed to ambient air.

A still further object of the invention is to provide a supporting structure for refractory brick comprised of a plurality of steel plates maintained in erected vertical positions by a plurality of vertically mounted steel beams confined at each end within and firmly affixed to concentric supporting steel hoops overlying either side of the steel beams to which the hoops are welded or otherwise firmly affixed.

Still a further object of the invention is to provide perforations in an existing or newly fabricated steel bottom plate for a furnace of refractory bricks, which plate is provided with a plurality of elongated, substantially radial slots for exposing the refractory bricks to the ambient atmosphere and for inducing a thermal updraft across the surfaces of the exposed bricks, whereby said bricks are cooled.

Other objects and many attendant advantages of the invention will become apparent upon a further perusal of the following detailed description taken in conjunction with the accompanying drawings, wherein:

FIG. 1 is a development in side elevation of a plurality of vertical steel plates forming a refractory brick supporting structure according to the invention;

FIG. 2 is a plan view, partly in section along the line a—a of FIG. 1, and illustrating the steel plates of FIG. 1 erected with associated I-beam supports to form a generally cylindrical supporting wall for a furnace;

FIG. 3 is a bottom view of the furnace illustrated in FIG. 2, and particularly illustrating a steel bottom plate therefor, which plate is provided with a plurality of elongated slots.

Figure 4:
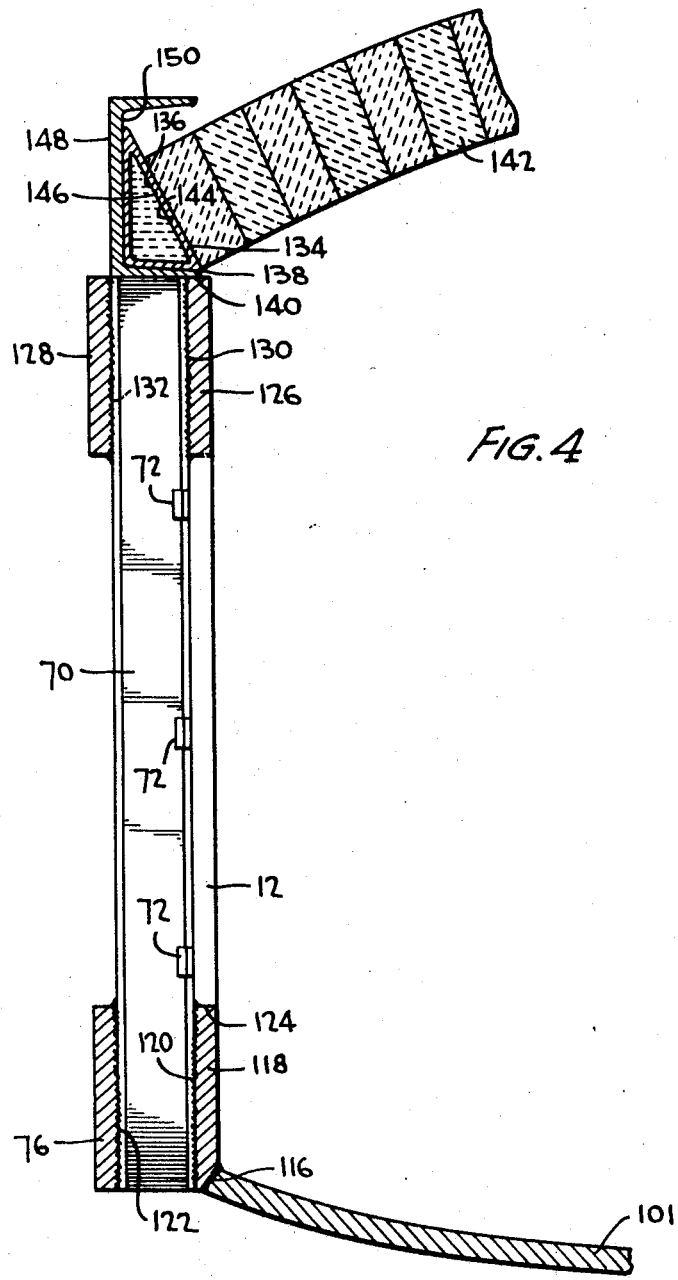
FIG. 4 is a detailed section along the line b—b of FIG. 2, and illustrating the particular construction of the steel plates of FIG. 1 erected with associated I-beam supports and surrounding hoops.

With more particular reference to FIG. 1 of the drawings, a vertical supporting structure for refractory bricks in an electric arc steel furnace is illustrated generally at 10 and comprises a plurality of steel plates, such as the plates 12, 14, 16, 18, 20, 22, 24, 26, 28, 30, 32 and 34. The plate 18 is provided with a generally rectangular door opening 36. The steel plate 30 is provided with a tapping hole 38. Both the door opening 36 and the tapping hole 38 are shown as generally rectangular notches. However, it should be understood that they may take any desired configuration.

With reference to FIG. 2, an electric arc steel furnace, indicated at 40, comprises an inverted, dome-shaped refractory brick floor 42 and a vertical sidewall of refractory bricks 44. The plurality of slotted steel plates surround the refractory bricks in the sidewall 44 and form an outer supporting sidewall therefor. The lateral edge of each of the steel plates abut against the lateral edge of an adjacent steel plate to provide a vertically disposed joint therebetween, such as the joint 46 formed between the adjacent plates 12 and 14. In similar fashion, a joint 48 is formed between the plates 14 and 16, a joint 50 between the plates 16 and 18, a joint 52 between the plates 18 and 20, a joint 54 between the plates 20 and 22, a joint 56 between the plates 22 and 24, a joint 58 between the plates 24 and 26, a joint 60 between the plates 26 and 28, a joint 62 between the plates 28 and 30, a joint 64 between the plates 30 and 32, a joint 66 between the plates 32 and 34, and a joint 68 between the plates 34 and 12. With more particular reference to FIG. 2, a steel I-beam overlies each of the joints and is secured to the adjacent abutting steel plates associated with each of the joints. More particularly, a vertically extending steel I-beam 70 overlies the vertical joint 46 formed by the laterally abutting steel plates 12 and 14. The I-beam 70 is secured to the steel plates 12 and 14, respectively, by angle iron clamps 72 and 74, so that the plates and the I-beam may not move horizontally relative to each other. The angle iron clamps 72 and 74 are not attached to the I-beam 70, so that new plates can be easily installed to replace previous ones when necessary. With reference to FIG. 2, it can be seen that each of the other joints formed between each adjacent abutting pair of steel plates is provided with an overlying I-beam, similar to the I-beam 70, and secured from horizontal movement by an angle iron, similar to either of the angle irons 72 and 74.

Again with reference to FIG. 2, a surrounding steel hoop 76 circumscribes all of the vertically positioned I-beams and is secured thereto by welding, for example. The steel hoop 76 is provided to support the I-beams in vertical positions, and cooperates with each of the I-beams to provide a steel framework of sufficient rigidity to support the plurality of steel plates in abutting relationship against the refractory bricks of the sidewall 44 of the furnace 40. Additionally, the steel hoop 76, the vertical I-beams and the steel plates cooperate to retain the refractory brick in place while the furnace 40 is tilted for tapping or slagging. With reference to FIG. 1, the steel plates are shown impressed upon a silhouette 77 which illustrates the general appearance of the vertically positioned I-beams and the steel hoop 76. It should be understood that additional hoops similar to the steel hoops 76, may be provided for circumscribing the steel beams. A detailed description of such additional hoops will follow hereinafter.

The steel plate 18, provided with the door opening 36, is arranged to correspond to a door opening in the refractory brick sidewall 44 that is adjacent a sill 78 of the furnace 40. The steel plate 30, provided with a tapping hole 38, is aligned with a spout 80 of the furnace 40, which spout is directly opposite the sill 78.

With reference to FIG. 1, each of the steel plates 12, 14, 16, 18, 20, 22, 24, 26, 28, 30, 32 and 34 is provided with a plurality of openings according to the invention. For clarity, the openings in plate 18 are omitted in order to better illustrate the door opening 36. The plates 28, 30 and 32, which plates are adjacent the tapping hole 38, are provided with a plurality of horizontally spaced, vertically elongated openings 82, each having a width which is narrower than the widths of the refractory bricks comprising the sidewall 44 of the furnace 40. The openings therefore are sufficiently narrow to prevent the bricks from falling from the furnace sidewall 44 upon tipping of the furnace 40, commonly at an angle of 40-45° from the vertical, in order to empty the contents thereof through the tapping hole 38. Upon tipping of the furnace 40, the plates 28, 30 and 32 support, not only a component of the weight of the refractory bricks of the furnace sidewall 44, but also a component of the weight of the furnace charge which is being tapped. Accordingly, the openings 82 are separated by relatively wide load supporting webs 84 provided by the steel plates, which webs prevent shifting or bulging of the refractory brick sidewall 44 when the furnace 40 is tipped for tapping the heat. In the preferred embodiment, in which refractory bricks of three inches by three inches cross-section are used, the width of the openings accordingly are 2½ inches wide and the widths of the webs 84 are 7½ inches, respectively. The openings 82 are shown as vertically elongated notches. However, they may take any configuration, such as slots, for example. It was found that notches are easy to fabricate and do not weaken the edge configuration of the steel plates from which the notches are cut. As shown in the figure, each of the plates 28, 30 and 32 are provided with the notches 82, cut from both the upper and lower horizontal marginal edges of each of the plates, thereby leaving a horizontal rib of metal 86 intersecting each of the webs 84 between an adjacent pair of the openings 82. Each of the ribs 86 further provides rigidity to the plates.

In a similar fashion all the remaining steel plates may be provided with vertically elongated openings. Such openings may be of the same dimensions as the openings 82 in each of the plates 28, 30 and 32, in order to prevent dislodgement of the refractory bricks. However, it was found to be advantageous to provide openings of greater dimensions in the remaining steel plates, since the remaining steel plates are never directly under the brick in the sidewall and therefore support much lighter loads than do the steel plates 38, 30 and 32 when the furnace 40 is tipped for tapping the heat. More specifically, the load supporting requirements of the steel plates decrease in direct proportion to their respective distances from the tapping hole 38, and, therefore, the widths of each of the openings in each plate may progressively increase to advantageously expose a progressively larger number of refractory bricks to the cooling effect of moving ambient air. For example, the steel plate 26 is provided with a plurality of notches 88, 90 and 92 cut from the lower horizontal edge thereof. The opening 88 may have a width of 9 inches, whereas the opening 90, being further away from the tapping hole 38 than the opening 88, may have a width of 12 inches. The width of the opening 92, being further away from the tapping hole than either of the openings 88 and 92, may have a width of 15 inches. The web 94 separating the openings 88 and 90 may have a width of 10½ inches, whereas the web 96 which separates the openings 90 and 92 is further away from the tapping hole 38 than the web 94 and may have a width of 9 inches. Spaced immediately above each of the openings 88, 90 and 92 is an opening 98, each of which openings are cut from the upper horizontal edge of the plate 26, and which may be of the same dimensions as the opening immediately therebelow, or, as illustrated in FIG. 1, of a smaller dimension. The openings 98 are separated by webs 99 which are similar except in width to the webs 94 and 96. The widths of the respective openings are also governed by the temperature attained by the refractory bricks. More specifically, the hotter the brick becomes, the more rapid the wear because the hot strength of the brick decreases as temperature increases, hence, the need for more cooling attained by providing wider openings. Accordingly, the present invention is well suited to provide relatively wide openings in the portions of supporting structure immediately adjacent the commonly occurring hot spots of an electric arc steel furnace, specifically opposite the three phases, with the hottest phase, requiring the widest openings in the shell, occurring at the mast wall, in most furnaces.

The webs 94, 96 and 99 intersect a continuous horizontal web 100 separating the upper openings 98 from the lower openings 88, 90 and 92 in the plate 26. With reference to FIG. 1, it can be seen that the plate 34 is spaced from the tapping hole 38 at the same distance as the plate 26. Accordingly, it is provided with openings having the same size and spacing as the openings in the plate 26. To avoid needless repetition, a detailed description of the openings in the plate 34 is omitted. In a similar fashion, each of the remaining plates 12, 14, 16, 18, 20, 22 and 24 may be provided with upper and lower openings of a size and spacing governed by the amount of load to be supported and the number of bricks to be exposed for cooling. In this regard, the openings of greatest width, for example, the openings shown in plate 24, should always be at the location of the worst hot spot, of which there may be a plurality, experienced in the use of an electric furnace. The general rule to follow for providing openings according to the invention, is that the proportion of opening area to web area should increase as the temperature of the brick increases. For simplicity, the remainder of the plates and associated openings are illustrated but are not described in detail, it being understood that they serve the same objectives as each of the plates heretofore described in detail.

An advantage resulting from the provision of vertically elongated openings of the type described is that, as the exposed bricks become hotter from the heating effects of the furnace charge, an updraft of air is produced along the elongated vertical dimensions of the openings and thus across the surfaces of the exposed bricks. As the bricks increase progressively in temperature, due to the heat transferred thereto by the furnace charge, a progressively greater updraft is produced, thereby cooling the outer ends of the bricks, to produce a steep temperature gradient through the brick wall, thereby increasing its useful service life as previously described.

With more particular reference to FIG. 3, there is shown an inverted, dome-shaped bottom plate 101 rigid enough to support the furnace bottom 42, the sidewall 44 and the charge. A plurality of elongated slots, such as the slots 102, 104, 106 and 108, are provided in the bottom plate 101, which slots are provided to expose the surfaces of the refractory bricks in the bottom 42 of the furnace 40 to the cooling effects of moving ambient air. The slots provided in the bottom plates 101 extend in a direction normal to the outer supporting sidewall formed by the steel plates, heretofore described, in order to induce a radially outward flow of ambient air along the elongated dimension of the slots and over the surfaces of the exposed refractory bricks. Although the size of the elongated slots are limited due to load supporting requirements for the bottom plate 101, it was found, by varying the lengths of said slots, that a maximum number thereof could be provided. Accordingly, the bottom plate 101 is provided with a plurality of additional slots, such as the slots 110, 112 and 114, to provides slots of four different lengths, which slots are distributed and so constructed and arranged as to prevent their intersecting with one another, and in a direction normal to the outer sidewall.

With specific reference to FIG. 4 of the drawings, there will be described an exemplary structure completing the fabrication of the supporting structure heretofore described. FIG. 4 is a section generally along the line B—B of FIG. 2 and additionally illustrating in section both the lower and upper portions of the sidewall supporting steel plates together with a portion of the furnace roof structure and a portion of the perforated bottom plate of the furnace. With reference now to the figure, there is shown at 101 a portion of the inverted dome-shaped bottom plate, heretofore described in detail. The plate 101 is secured, by welding for example, at its generally upwardly directed rim 116 to the lower complementary configured edge of a one-piece continuous steel hoop 118, which is welded along its entire height, generally indicated at 120, to the inwardly facing side of each I-beam, such as the I-beam 70, heretofore described. Additionally, as described, the hoop 76 is secured to the outwardly directed side of each I-beam. This hoop, in similar fashion to the hoop 118, may be secured to each I-beam by welding along its entire height, generally indicated at 122. As shown in FIG. 4, the hoops 76 and 118 form outer and inner continuous steel hoops, respectively, at the lower end portion of each I-beam. The inner hoop 118 is shown in FIG. 4 as having the same thickness as each of the steel plates, such as the steel plate 12. With reference to FIGS. 2 and 4, the steel plate 12 is mounted immediately vertically above the hoop 118, its lower edge 124 abutting against and resting upon the top edge of the hoop 118. As previously described, the steel plate 12 is provided with angle iron clamps 72, a plurality of such clamps being selectively secured in spaced relationship along the vertical edge of the plate 12 and removably interlocking the inner flange of the I-beam to permit the plate 12 to be removed and replaced when necessary. In a similar fashion, it is to be understood that all the remaining steel plates rest upon the top edge of the steel hoop 118 and are provided with a plurality of angle iron clamps similar to the clamps 72 for removably retaining the plates in position.

With reference yet to FIG. 4, there is shown welded to the upper end portion of the upstanding I-beam 70 a pair of inner and outer hoops 126 and 128, respectively. The hoops 126 and 128 are welded to the I-beam 70 along their entire heights, as shown at 130 and 132. Similarly, the hoops are secured to the remaining I-beams in similar fashion. Accordingly, it can be seen that the hoops 126 and 128 are similar in construction to the hoops 118 and 76. The hoop 126 is of the same thickness as each of the steel plates, such as the plate 12 supported on the hoop 118. Together the inner upper and outer hoops 126 and 128 and the lower inner and outer hoops 118 and 76 support the steel beams in vertical positions, the outer hoops 128 and 76 circumscribing the beams.

As shown in FIG. 4, the top end of the beam 70, as well as the remaining beams, supports a generally annular steel roof skew 134 which is generally triangular in cross-section and has a hollow interior 136 to admit a circulating coolant such as water. An inwardly directed edge 138 of the skew 134 overlies the topmost edge 140 of the inner hoop 126. A portion of a dome-shaped furnace roof is shown at 142 and typically is fabricated from refractory brick. The lateral peripheral edge 144 which generally defines the outer circumference of the dome roof is retained in place by an inclined sidewall 146 of the roof skew. The skew is backed up by a channel 148 receiving the skew 134 in the lower portion of the bottom wall 150 of the channel. The channel 148 is so constructed and arranged as to circumscribe the roof skew 134 and is suitably secured to the top portions of the upstanding beams, such as the beam 70 as shown.

Although preferred embodiments of a perforated steel supporting structure for a furnace have been described, it is obvious from the foregoing description that an existing steel supporting structure for a furnace may be easily modified, according to the concepts embodied in the invention, to provide a plurality of slots or notches elongated either vertically or horizontally for exposing the outer surfaces of the furnace refractory bricks to a thermal updraft created by the "chimney effect" due to the presence of such perforations in the structure. Accordingly, there has been provided, not only a preferred embodiment of a steel supporting structure for extending the useful service of a refractory brick furnace, but also a teaching of modifying existing steel supporting structures for a refractory brick furnace in order to extend the useful service of heretofore existing refractory brick furnaces.

Although preferred embodiments of the invention have been illustrated and described, other embodiments and advantages are within the scope of the invention as set forth in the specification and the appended claims, wherein:

What is claimed is:

1. A supporting structure for a furnace comprised of refractory bricks, the combination comprising, a plurality of slotted steel plates surrounding said refractory bricks and forming an outer supporting side wall for said refractory bricks, each of said plates abutting an adjacent steel plate to provide a vertically disposed joint therebetween, and overlying means at said joints supporting said plates in vertical positions in abutting relationship against said refractory bricks.

2. The structure as recited in claim 1, wherein said means comprises a vertical steel beam overlying each of said joints and secured to each steel plate adjacent to each of said joints, and four steel hoops circumscribing and supporting said steel beams in vertical positions.

3. The structure as recited in claim 1, and further including, an inverted dome-shaped bottom plate beneath said refractory bricks, which plate is provided with a plurality of elongated slots for exposing the surfaces of said refractory bricks to moving ambient air, to cool the outer ends of the bricks, thereby producing a steeper temperature gradient in the brick, thus reducing the depth of penetration of molten slag and fumes into the brick, thereby reducing the speed of slag corrosion, metal erosion and the depth of spalls and increasing service life of the refractory brick lining.

4. The structure as recited in claim 1, wherein each of said steel plates is provided with a plurality of elongated openings therein to expose the surfaces of said refractory bricks to moving ambient air, thereby cooling the brick, and increasing length of service of the refractory lining.

5. The structure as recited in claim 1, wherein each of said steel plates is provided with a plurality of spaced elongated openings therein for exposing the surfaces of said refractory bricks to moving ambient air, and wherein each of said openings provided in said plates is elongated preferably in a vertical direction to produce an updraft of ambient air over the exposed surfaces of said refractory bricks, to cool the bricks and increase the length of service of the refractory lining.

6. The structure as recited in claim 3, wherein said elongated slots provided in the bottom plate extend in directions normal to said outer supporting sidewall to produce a radially outward flow of ambient air along the elongated dimensions of the slots and over the exposed surfaces of said refractory bricks, thereby cooling the refractories and increasing the length of service.

7. The structure as recited in claim 5, wherein one of said steel plates is provided with a tapping hole, through which the contents of said furnace may be tapped by tipping, and with a plurality of spaced, vertically elongated openings, each having a width which is narrower than the width of each of said refractory bricks, thereby preventing movement of said bricks upon tipping of said furnace.

References Cited

UNITED STATES PATENTS

| | | | |
|---|---|---|---|
| 1,754,514 | 4/1930 | Hobbs | 110—1 |
| 2,148,856 | 2/1939 | Cope | 266—43 |
| 3,061,295 | 10/1962 | Martin et al. | 263—46 |

H. B. GILSON, Primary Examiner

U.S. Cl. X.R.

263—46; 266—43